United States Patent
Satermo

(10) Patent No.: US 10,455,992 B2
(45) Date of Patent: Oct. 29, 2019

(54) HAND DRYER HAVING MANAGED AIR FLOW

(71) Applicant: The Boeing Company, Chicago, IL (US)

(72) Inventor: Eric K. Satermo, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 306 days.

(21) Appl. No.: 15/270,991

(22) Filed: Sep. 20, 2016

(65) Prior Publication Data

US 2018/0078101 A1    Mar. 22, 2018

(51) Int. Cl.
*A47K 10/48* (2006.01)
*B64D 11/02* (2006.01)
*B64D 13/06* (2006.01)

(52) U.S. Cl.
CPC .............. *A47K 10/48* (2013.01); *B64D 11/02* (2013.01); *B64D 2013/0629* (2013.01)

(58) Field of Classification Search
CPC . A47K 10/48; B64D 11/02; B64D 2013/0629
USPC ..................................... 34/90, 487
See application file for complete search history.

(56) References Cited

U.S. PATENT DOCUMENTS

| | | | | |
|---|---|---|---|---|
| 540,235 A * | 6/1895 | Clifford | ................. | E03C 1/182 4/640 |
| 3,766,397 A | 10/1973 | Rockson | | |
| 5,459,944 A * | 10/1995 | Tatsutani | ................ | A47K 10/48 34/202 |
| 7,971,368 B2 * | 7/2011 | Fukaya | .................. | A47K 10/48 222/1 |
| 8,201,344 B2 * | 6/2012 | Sawabe | .................. | A47K 10/48 132/73.5 |
| 8,544,186 B2 * | 10/2013 | Hsu | ......................... | A47K 10/48 34/202 |
| 8,607,472 B2 * | 12/2013 | Ishii | ....................... | A47K 10/48 15/97.1 |

(Continued)

FOREIGN PATENT DOCUMENTS

| | | | | |
|---|---|---|---|---|
| CA | 2831955 A1 * | 10/2012 | ............... | A47K 1/04 |
| IE | 2657164 | 6/1978 | | |

(Continued)

OTHER PUBLICATIONS

Extended European Search Report dated Jan. 19, 2018 for European Patent Application No. 17190600.1.

(Continued)

*Primary Examiner* — Stephen M Gravini
(74) *Attorney, Agent, or Firm* — Gates & Cooper LLP

(57) ABSTRACT

A method and apparatus for drying objects in low-volume enclosed spaces is disclosed. In one embodiment, the apparatus is a hand dryer that comprises a dryer cavity including an input port, an exhaust port, and an opening for insertion of a hand having moisture thereon, an air channel, pneumatically coupling the exhaust port of the dryer cavity to the input port of the dryer cavity, the air channel substantially isolated from an interior volume of the lavatory, and a blower, communicatively coupled to the air channel, for moving air through the air channel and the dryer cavity.

20 Claims, 8 Drawing Sheets

(56) References Cited

U.S. PATENT DOCUMENTS

| | | | |
|---|---|---|---|
| 8,813,383 B2* | 8/2014 | Liu | A47K 10/48 |
| | | | 15/97.1 |
| 9,125,533 B2* | 9/2015 | Babikian | A47K 10/485 |
| 9,441,885 B2* | 9/2016 | Bayley | A47K 4/00 |
| 2013/0283629 A1 | 10/2013 | Bueker | |
| 2015/0210398 A1 | 7/2015 | Vue | |
| 2018/0078101 A1* | 3/2018 | Satermo | A47K 10/48 |

FOREIGN PATENT DOCUMENTS

| | | | |
|---|---|---|---|
| JP | H11-197055 | 7/1999 | |
| WO | 2010089926 | 8/2010 | |
| WO | 2012076521 | 6/2012 | |
| WO | WO-2012139117 A1 * | 10/2012 | A47K 10/48 |
| WO | 2016016938 | 2/2016 | |

OTHER PUBLICATIONS

European Examination Report dated Apr. 18, 2019 for European Patent Application No. 17190600.1.

* cited by examiner

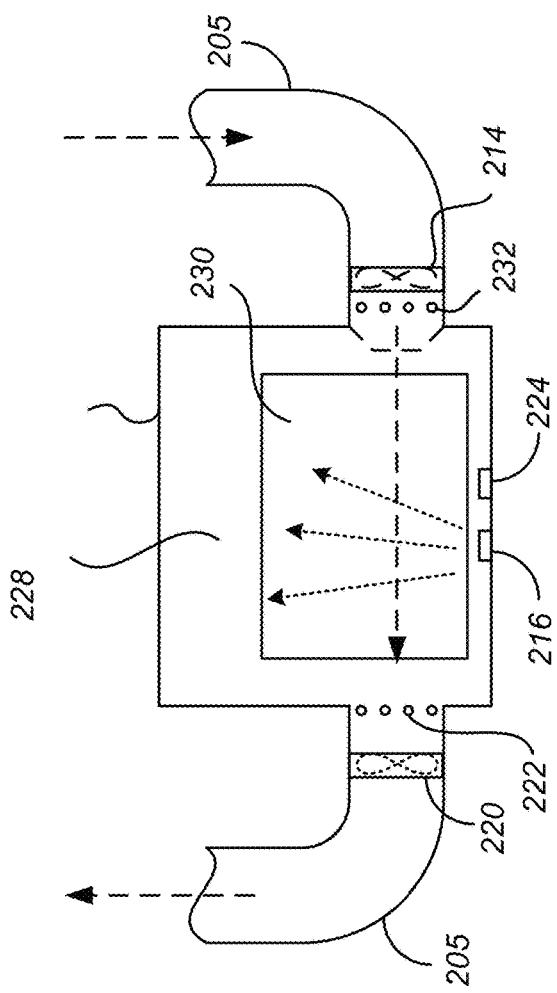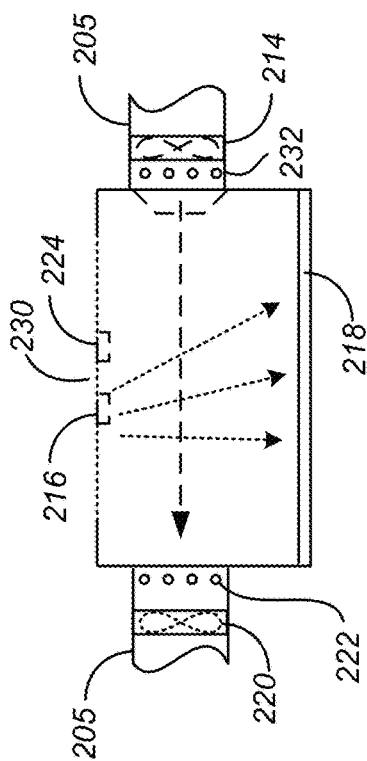

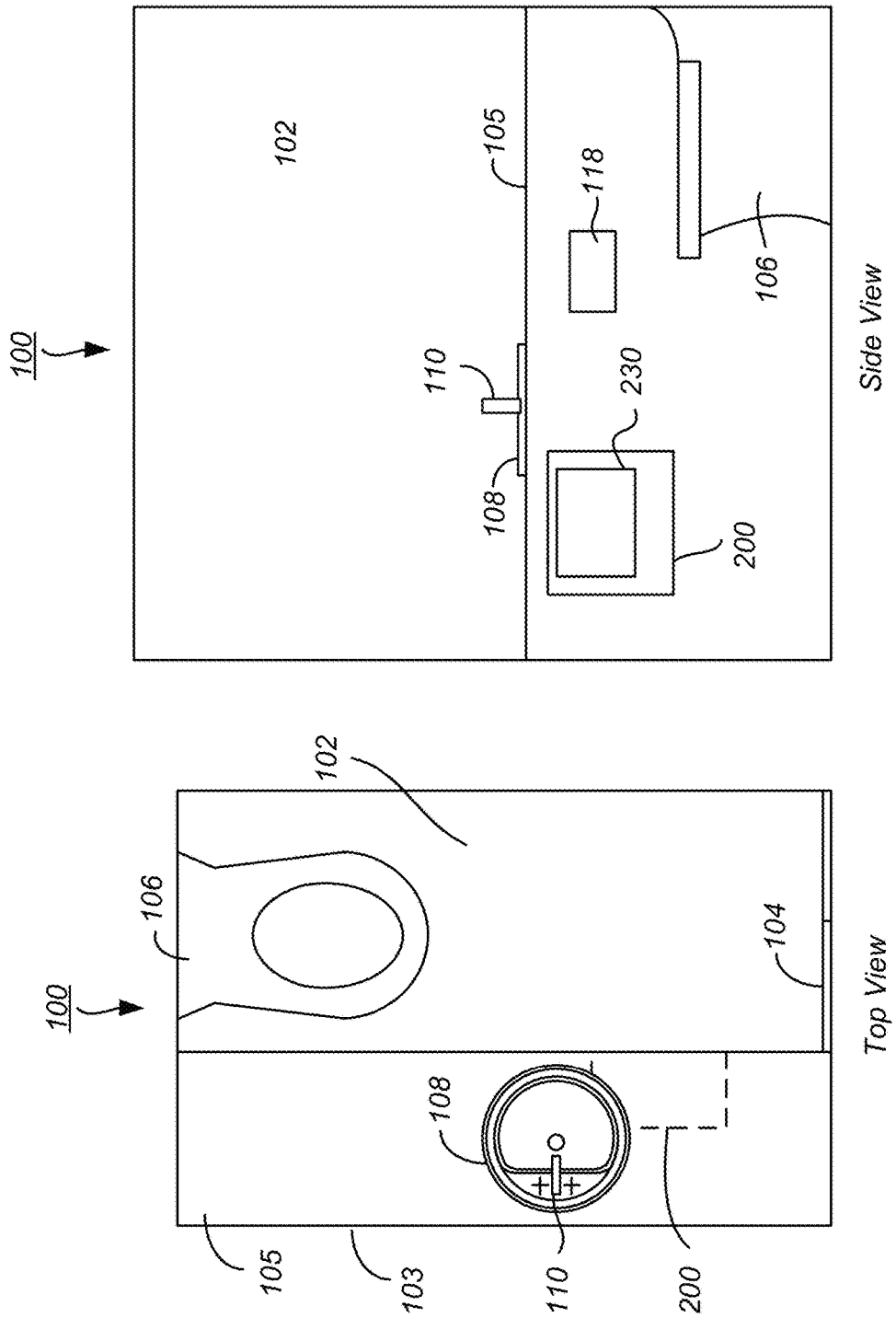

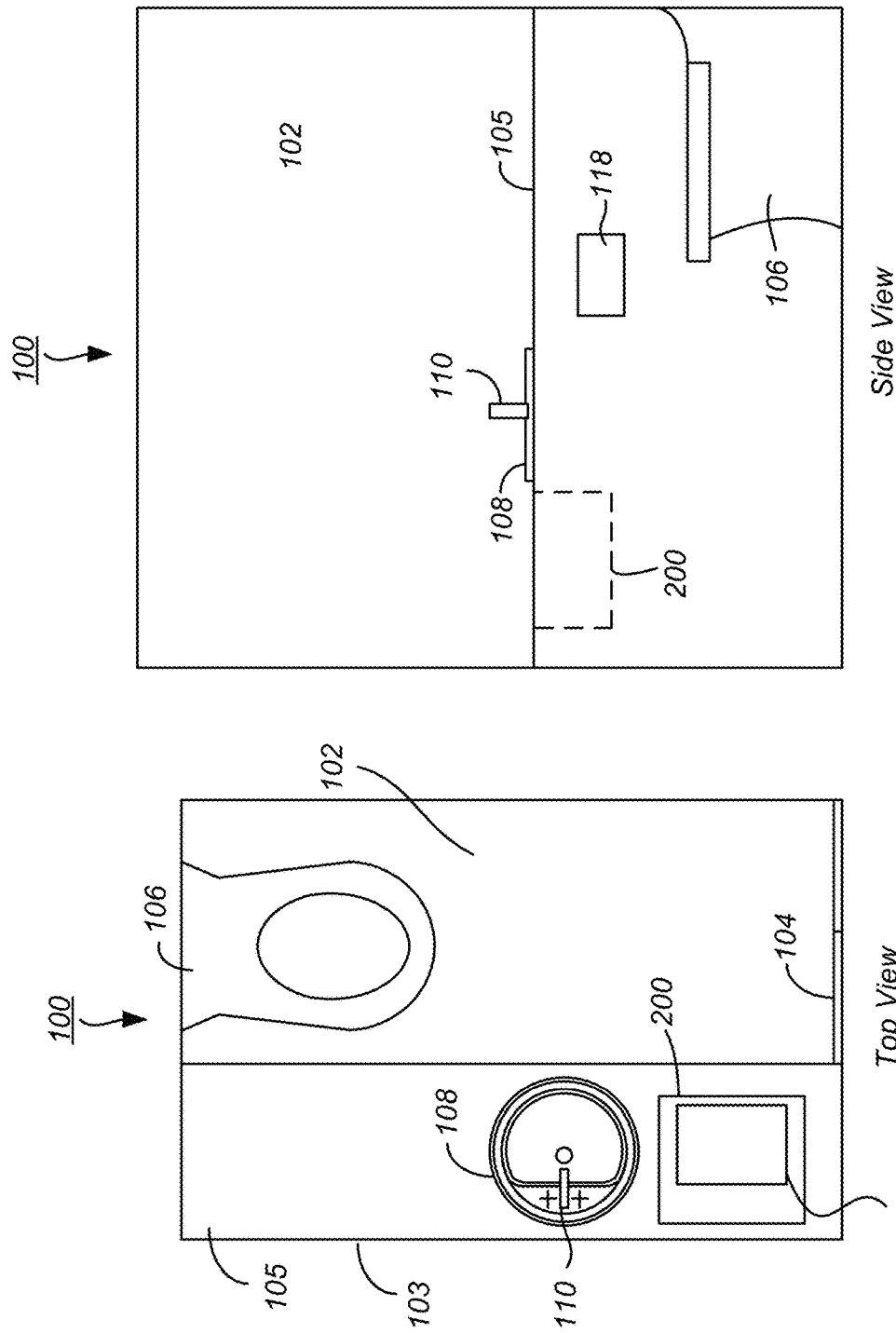

HAND DRYER HAVING MANAGED AIR FLOW

BACKGROUND

1. Field

The present disclosure relates to systems and methods for drying hands, and in particular to a system and method for drying hands in an enclosed environment.

2. Description of the Related Art

For many years, aircraft have been fitted with aircraft lavatories, for use by passengers and crew. Such lavatories include a washbasin and faucet to allow users to wash their hands, and offer paper towels for purposes of drying their hands after washing.

While effective, drying hands with paper towels has a number of disadvantages. First, the supply of paper towels in each lavatory must be periodically checked and replenished. Second, paper towels must be discarded after use. Although lavatories are equipped with a vessel for disposing of paper towels, it is not unusual for paper towels to be dropped in the lavatory itself instead of the vessel. Further, such vessels are typically covered by a spring loaded door, requiring the user to physically touch the door to urge it forward to place the paper towel in the vessel. This presents an opportunity to spread germs to the door, and hence to other passengers. Third, paper towels must be removed from the vessels in the lavatory on a frequent basis and disposed of in a location other than the aircraft. Finally, once removed from the aircraft, the waste generated by paper towels must be recycled or otherwise disposed of.

These problems have led to the use of air-driven hand dryers instead of paper towels for many applications. For example, the "Sterilizing Hand Dryer" disclosed in U.S. Pat. No. 3,766,397 (hereby incorporated by reference herein) draws air from the room in which it is installed via port (23) and exhausts the moisturized air through a second port (29). This allows the exhausted air to increase the temperature of the room in which the hand dryer is installed, and renders it ineffective for use in a small enclosed volume and or recirculating ventilation such as an aircraft lavatory. U.S. Patent Application 2015/0210398 (also hereby incorporated by reference herein) discloses integrating a lavatory and galley ventilation system (LGVS) of an aircraft with the environmental control system of an aircraft to facilitate movement of waste air, but does not address the additional and significant load placed on such systems when hand dryers are used.

There is an on-going need in the art for air-driven hand dryers that address shortcomings of conventional designs.

SUMMARY

This document discloses a system and method for drying hands or other objects in a lavatory of an aircraft. In one embodiment, the system comprises a dryer cavity including an input port, an exhaust port, and an opening for insertion of a hand having moisture thereon, an air channel, pneumatically coupling the exhaust port of the dryer cavity to the input port of the dryer cavity, the air channel substantially isolated from an interior volume of the lavatory, and a blower, communicatively coupled to the air channel, for moving air through the air channel and the dryer cavity. Another embodiment is evidenced by a method of drying a hand in a lavatory of an aircraft, which comprises accepting a hand having moisture thereon in an opening of a dryer cavity having an input port and an exhaust port, blowing air through the dryer cavity via the input port, the blown air removing at least some of the moisture from the hand accepted into the opening of the cavity, and exhausting substantially all of the blown air from the dryer cavity external to the lavatory through the exhaust port. Still another embodiment is evidenced by a means for performing the foregoing operations.

Conventional air-driven hand dryers have particular disadvantages when used in aircraft, small vehicles, or other applications where involving closed spaces. In particular, (1) use of a air-driven hand dryer it further lowers the humidity in the aircraft cabin; (2) the amount of air from the dryer relative to the volume of space in the lavatory (typically less than, e.g., 75 cubic feet) cause the temperature in the lavatory to be elevated during high-use periods, making the lavatory uncomfortable, and promoting bacteria growth; (3) the air blown from the dryer will also blow the water off of the user's hands onto the floor or surrounding surfaces. The embodiments described in this disclosure address and overcome these disadvantages.

BRIEF DESCRIPTION OF THE DRAWINGS

Referring now to the drawings in which like reference numbers represent corresponding parts throughout:

FIGS. 4A and 4B are diagrams illustrating another exemplary embodiment of the hand dryer;

FIGS. 5A and 5B are diagrams illustrating one embodiment of an installation of the hand dryer in an aircraft lavatory;

FIGS. 6A and 6B are diagrams illustrating another embodiment of the installation of the hand dryer in the aircraft lavatory.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

A hand dryer with managed air flow is described below. The hand dryer directs air into a hand drying cavity, into which the user inserts their hands. Moisture blown or evaporated from the user's hands is collected at an exhaust port of the cavity and removed from the lavatory. This prevents moisture and humidity from escaping the hand dryer, thus reducing the spread of microbes while also minimizing the impact of the blown air upon the humidity and temperature of the lavatory and the aircraft cabin. The hand dryer has a number of optional features, including an automatic engagement feature, which turns the hand dryer on when the user inserts their hands into the cavity, an antimicrobial source (such as a ultraviolet (UV) light emitter) to assist in the sanitation of the user's hands, the use of a second fan to affirmatively vacuum moisture laden air from the cavity, and the use of inert air as the source of positive air flow.

In one embodiment, the cavity includes inlet to provide air to the cavity and an exhaust air duct to channel the air back to the dryer to be recycled. Alternatively, the exhaust duct may feed the air to some other air management system [e.g., the environmental control system (ECS) of the aircraft]. Another feature of the hand dryer is a water management device for containing water blown off of the hands by the dryer so that the blown water does not end up on the floor of the lavatory or on surfaces in the lavatory.

Figures 1A, 1B:
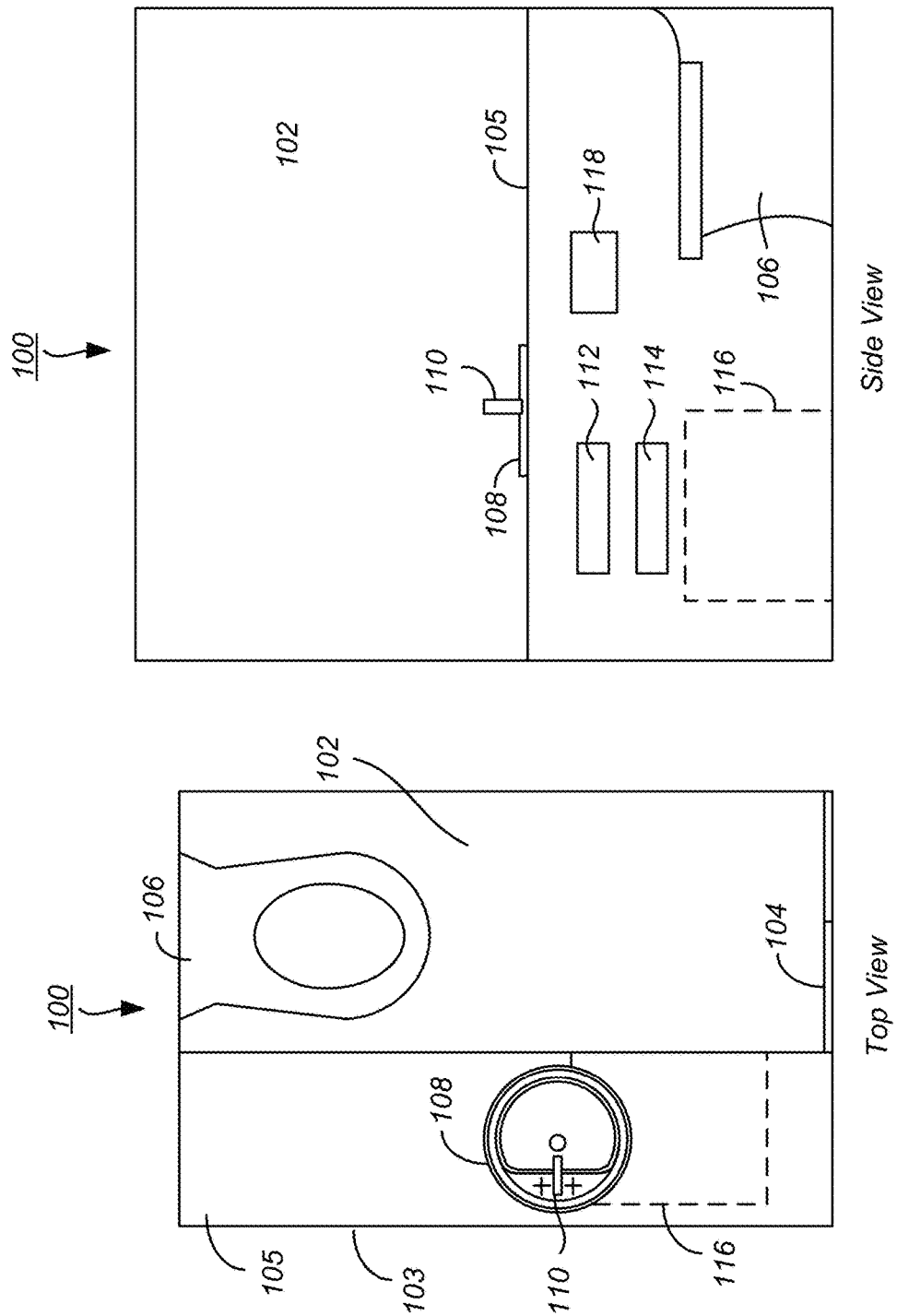
FIGS. 1A and 1B are diagrams presenting respective top and side views of a typical aircraft lavatory.

FIGS. 1A and 1B are diagrams presenting respective top and side views of an enclosed lavatory 100 such as an aircraft lavatory. The lavatory 100 includes a lavatory interior volume 102 enclosed by lavatory walls 103, a counter 105, and other interior surface of the lavatory 100. The lavatory 100 also includes one or more doors 104 which permit access to the lavatory 100. Doors 104 are typically compact folding doors.

The lavatory may also comprise a toilet 106 and a water faucet 110 having a proximally disposed washbasin 108 for washing the user's hands. Typically, such lavatories 100 also include a toilet paper dispenser 118 and/or a paper towel dispenser 112. The paper towel dispenser 112 dispenses paper towels for the purpose of drying the user's hands. After use, the paper towels can be inserted into paper towel disposing aperture 114, which allows the paper towel to drop into a disposal vessel 116. As described above, the paper towel dispenser 112 must be periodically replenished with paper towels, and the disposal vessel 116 must be emptied of used paper towels.

Figure 2A:
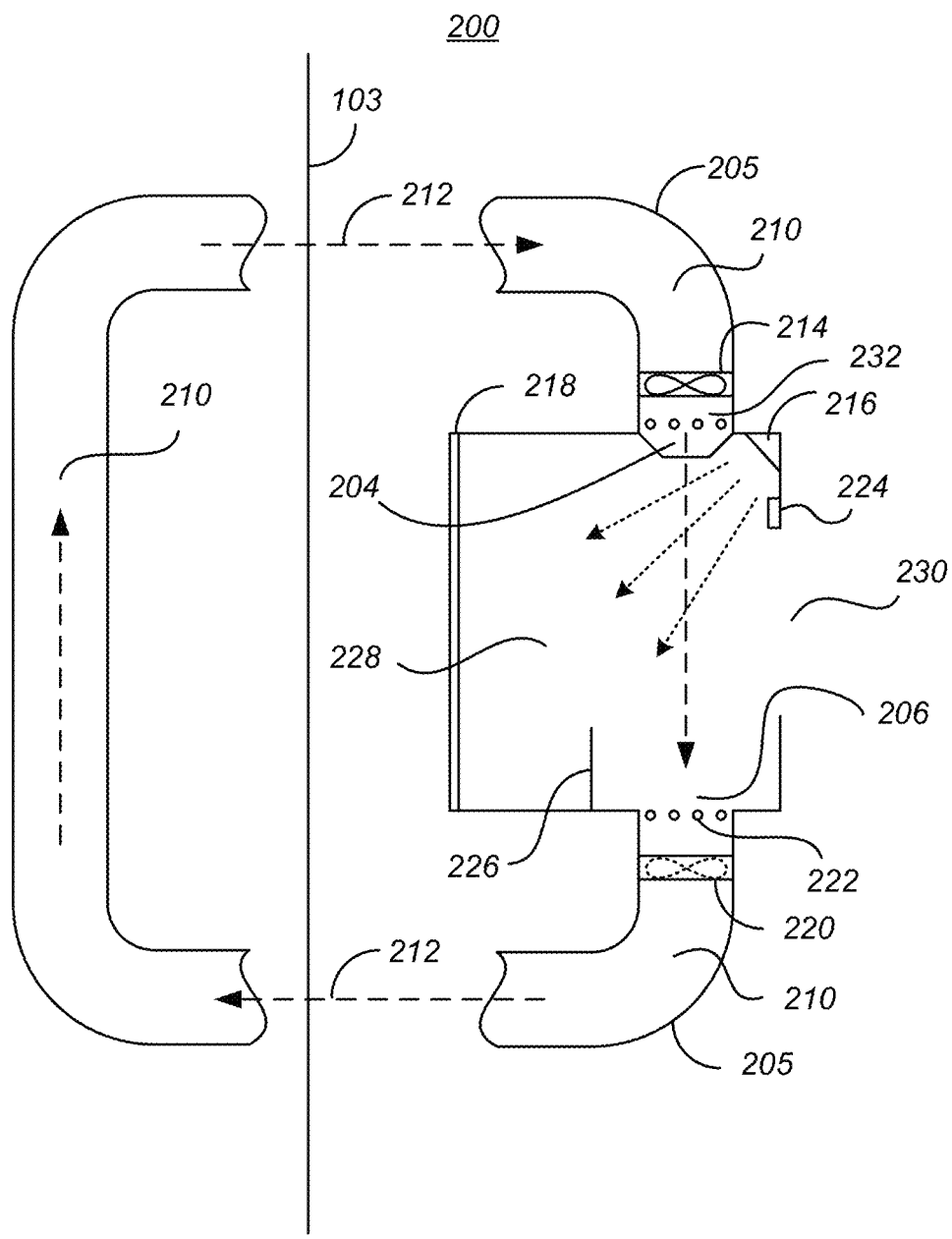
FIG. 2A is a diagram of one embodiment of a hand dryer for use in an aircraft lavatory.

FIG. 2A is a diagram of one embodiment of a hand dryer 200 for use in an aircraft lavatory 100. The hand dryer 200 comprises a dryer cavity 228 having an input port 204, an exhaust port 206, and an opening 230 for the insertion of one or more hands having moisture thereon. The hand dryer 200 also comprises an air channel 210 that pneumatically couples the exhaust port 206 of the dryer cavity 228 with the input port 204 of the cavity 228. The air channel 210 is substantially pneumatically isolated from the interior volume 102 of the lavatory 100, and is at least partially comprised of ducting 205. The vertically oriented configuration of the ducting 205 is shown for illustrative purposes only, as the ducting 205 may be routed in any direction necessary to install the hand dryer 200 in the desired location in the lavatory. The hand dryer 200 also comprises or is connected directly or indirectly to a blower 214 pneumatically communicatively coupled to the air channel 210, for moving air through the air channel 210 and the dryer cavity 228. The blower 214 may exit in different part of the vehicle such as an air circulation engine in an airplane. It can blow air out or in.

In the illustrated embodiment, the hand dryer comprises a substantially closed-circuit air path 212 in which the exhaust port 206 of the dryer cavity 228 is pneumatically sealingly coupled to the input port 204 of the dryer cavity 228. In one embodiment, the closed circuit air path 212 include elements that assist in the drying and cooling (if necessary) of the air as it is passed through the air channel 210. Such elements can include, for example, baffling or heat sinks.

Figure 2B:
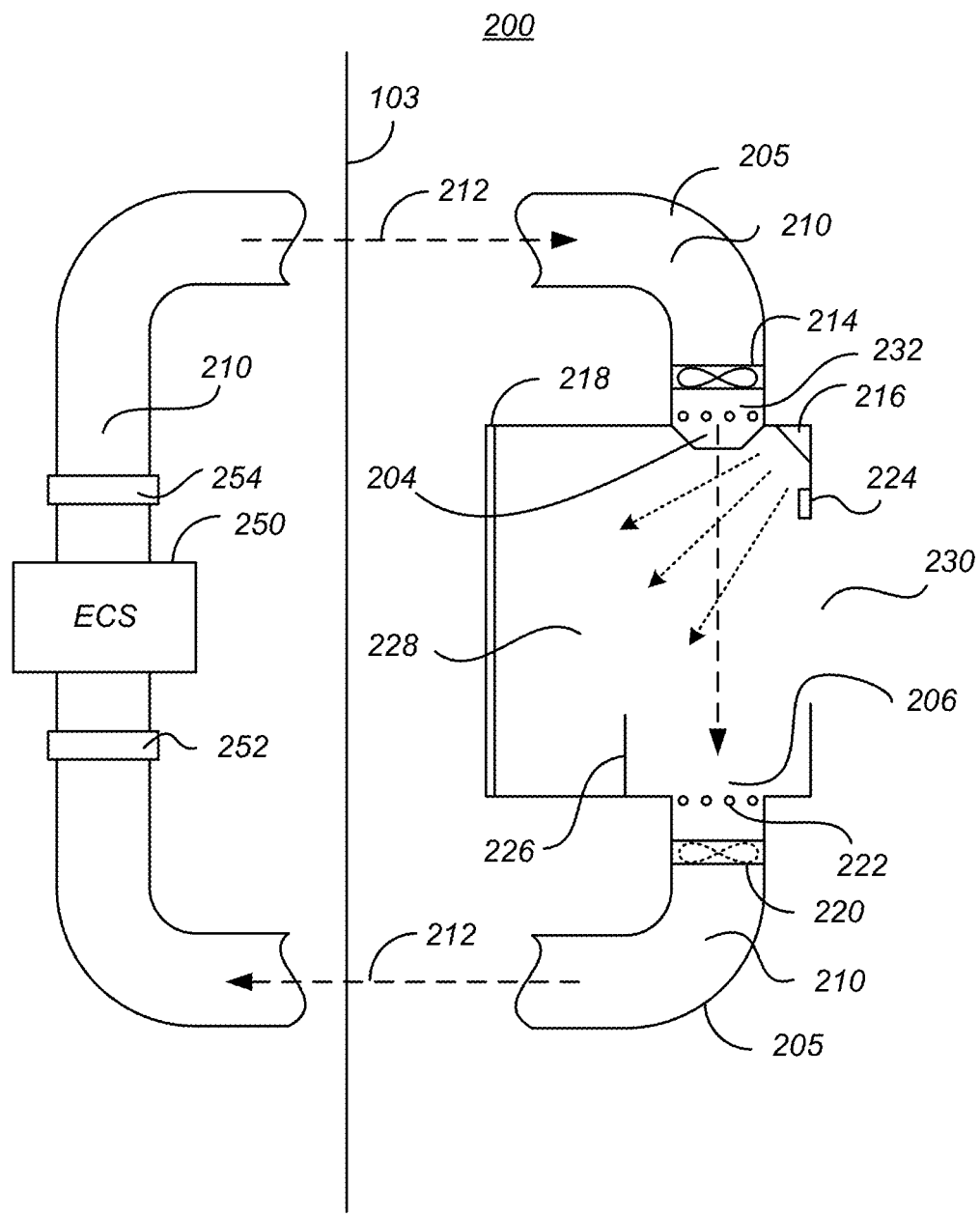
FIG. 2B is a diagram of another embodiment of the hand dryer.

FIG. 2B is a diagram of another embodiment of the hand dryer 200. In this embodiment, the aircraft comprise an environmental control system (ECS) 250. The ECS 250 includes air intakes to accept air from the aircraft cabin and air vents to vent air into the aircraft cabin, and maintains a desired temperature, humidity, and atmospheric pressure in the aircraft cabin. In the embodiment illustrated in FIG. 2B, the air channel 210 pneumatically couples the exhaust port 206 of the dryer cavity 228 to the input port 204 of the dryer cavity 228 via the ECS 250. This is accomplished by configuring the hand dryer 200 such that the input port 204 of the dryer cavity 228 is pneumatically coupled to an ECS air source port 254 and the exhaust port 206 of the dryer cavity 228 is pneumatically coupled to the ECS air exhaust port 252. Consequently, the air passing through the cavity 228, and into the dryer cavity exhaust port 206 [which has become humidified (and optionally heated) is provided to the ECS 250] and does not enter the interior volume 102 of the lavatory 100. Instead, this air is provided to the ECS 250 where it may be dehumidified and cooled before being provided to the input port 204 of the dryer cavity 228.

In one embodiment, the dryer cavity 228 is substantially enclosed around the opening 230 (in which the user's hands are inserted) so that air moved by the blower 214 through the dryer cavity 228 is substantially exhausted from the dryer cavity 228 via the exhaust port 206 (and not the opening 230).

In the illustrated embodiment, the blower 214 is disposed proximate (and upstream of) the input port 204 of the dryer cavity 228, and also includes an optional second blower 220 disposed proximate (and downstream of) the exhaust port 206. This second blower 220 assists in the drawing of air from the dryer cavity 228 by creating a vacuum in the vicinity of the exhaust port 206. In one embodiment, the vacuum created is sufficient to draw virtually all of the air blown into the dryer cavity 228 by the blower 214 through the exhaust port 206 and into the air channel 210. In another embodiment, the vacuum created by the second blower 220 is sufficient to draw additional ambient air from the interior volume 102 of the lavatory 100, thus assuring that none or virtually none of the air blown into the dryer cavity 228 by blower 214 escapes the dryer cavity 228 and enters the interior volume 102 of the lavatory 100. Although the input port 204 and the exhaust port 206 are illustrated as being of the same dimension, this need not be the case. The input port 204 may be smaller than illustrated to create a venturi effect to increase the speed of the air blown into the cavity 228, and the exhaust port 206 may be larger than illustrated to draw more air from the cavity 228. Likewise, blowers 214 and 220 may be of different sizes, or use different configurations. For example, while blowers 214 and 220 both show the use of a propeller to urge air therethrough, different impeller configurations can be used, including that of squirrel cage-type impellers. Furthermore, compressed air, blown into the area proximate the exhaust port 206 may be used to create the desired vacuum.

FIGS. 2A and 2B also illustrate a moisture containment device 222, to trap moister dripping or otherwise removed from the user's hands and prevent this moisture from going deeper into the air channel 210. The moisture containment device 222 may comprise one or more substantially pneumatically transparent screens, which may optionally be heated so as to evaporate any liquid moisture to gaseous form, where it can be removed, either in the closed circuit or ECS configuration of FIGS. 2A and 2B, respectively. In the illustrated embodiment, the moisture containment device 222 is disposed upstream from the second blower 220, but the moisture containment device 222 may instead be disposed downstream from the second blower 220.

FIGS. 2A and 2B disclose other optional hand dryer 200 features as well. For example, the hand dryer 200 may comprise a hand sanitizer 216 that directs an antimicrobial substantially into the user's hands when inserted in the dryer cavity 228. In one embodiment, the hand sanitizer 216 comprises a source of ultraviolet (UV) light, such as a far field UV emitter, far-UV emitting diode (LED), OLED, or germicidal UV source. In this embodiment, the UV LED is configured to direct energy substantially only within the dryer cavity 228, and the dryer cavity may optionally be configured to include one or more surfaces configured to substantially confine the UV light within the drying cavity 228. While all UV light may not be confined to within the drying cavity 228, the dryer cavity configuration is such that the amount and direction of the UV light that escapes from the dryer cavity is not harmful to humans in doses anticipated by the most frequent users of the lavatory. In the illustrated embodiment, such surfaces include a UV absorbing surface 218 or baffling surface 226. In another embodiment, the hand sanitizer 216 comprises a device that sprays a liquid or gaseous antimicrobial within the drying cavity 228.

FIGS. 2A and 2B also disclose another optional feature of the hand dryer 200, namely, an automatic activation device. The automatic activation device comprises a sensor 224 that transmits a signal to activate the hand dryer 200, turning on the blower(s), any heating elements, and other components when the it senses that the one or more of the user's hands have been inserted into the cavity 228. In one embodiment, the automatic activation device comprises a proximity sensor 224, that senses the proximity of the user's hands to the sensor. The proximity sensor 224 may be passive (e.g. sense energy emitted by the users hands), active (e.g. sense energy emitted by the proximity sensor 224 and reflected by the user's hands), or semi-active (e.g. sense energy provided by other sources such as lavatory 100 illumination). The proximity sensor 224 may also be a threshold crossing sensor that transmits an energy beam across the opening 230 and that includes a receiver to receive that energy beam and to detect when that energy beam is interrupted (thus indicating the insertion of an energy beam-opaque object into the opening 230). If an automatic activation device is not provided, the hand dryer 200 may be activated by a switch.

FIGS. 2A and 2B also illustrate another optional feature of the hand dryer 200, namely, a pneumatically transparent heater 232. Since heated air can dry hands faster than air of ambient temperature, the use of heater 232 to heat the air drawn from the air channel 210 and blown into the dryer cavity 228 can provide faster dry times.

Figure 3:
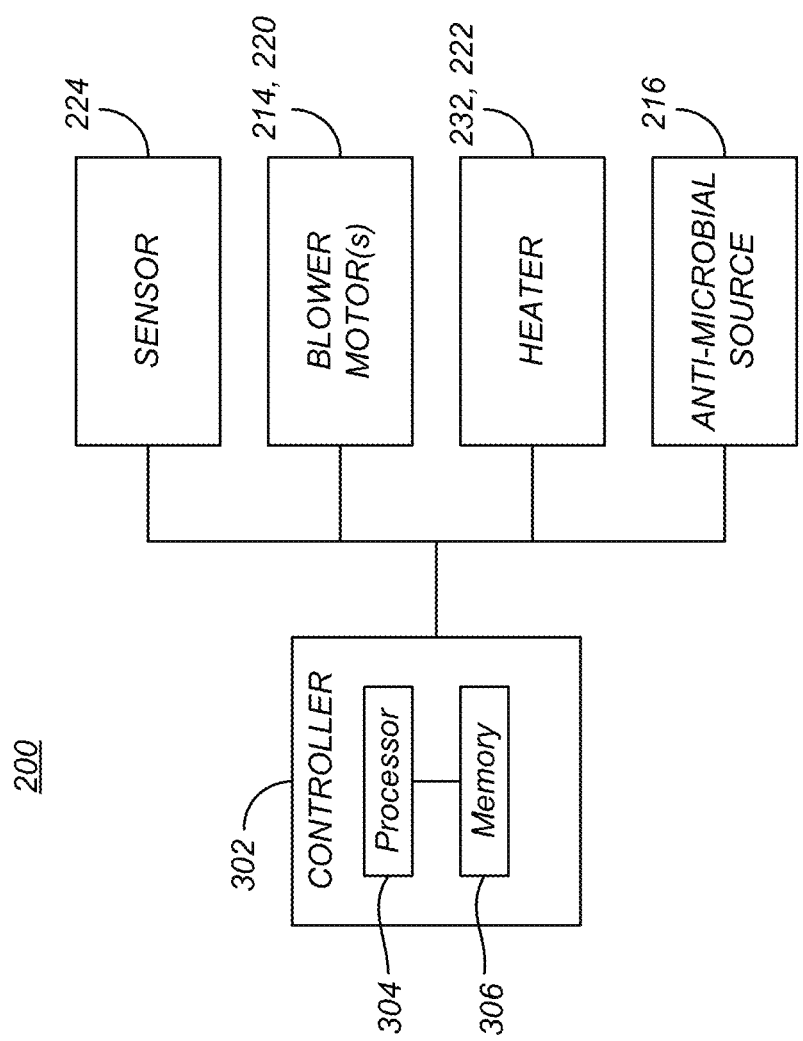
FIG. 3 presents a functional block diagram of one embodiment of the hand dryer.

FIG. 3 presents a functional block diagram of one embodiment of the hand dryer 200. The hand dryer 200 comprises a controller 302 communicatively coupled to the sensor 224 to accept the signal indicating that the user's hand(s) have been inserted into the dryer cavity 228. The controller 302 then sends a signal or power (or both) to activate the communicatively coupled blower motor(s) 214, 220, heater(s) 232, 222, and antimicrobial source 216, or any combination thereof according to the specific implementation. The controller also may monitor any combination of the temperature, humidity, and air flow within the dryer cavity 228 to assure proper operation, and if improper operation is sensed, shut off the hand dryer 200. This may occur, for example, if an object is inserted into the dryer cavity 228 and left there for an extended period of time.

In one embodiment, the controller 302 comprises a processor 304 and a communicatively coupled memory 306 storing processing instructions for performing the operations of the controller 302. The processor 304 may be communicatively coupled to other aircraft subsystems, including the ECS 250 so that the operation of the hand dryer 200 may be monitored or remotely controlled.

FIGS. 4A and 4B are diagrams illustrating another exemplary embodiment of the hand dryer 200. In the embodiments shown in FIGS. 2A and 2B, the hand dryer is vertically oriented. That is, the input port 204 and the exhaust port 206 are disposed on vertically opposing sides of the dryer cavity 228. FIGS. 4A and 4B illustrate an exemplary embodiment of the hand dryer 200 in which the input port 204 and the exhaust port 206 are disposed on horizontally opposing sides of the dryer cavity 100. An illustrative embodiment if this configuration of the hand dryer 200 is further illustrated below. One particular advantage of this embodiment, is that it prevents dripping water from the user's hands from entering the exhaust port 222 and can be conveniently mounted proximate to the washbasin 108.

FIGS. 5A and 5B are diagrams illustrating one embodiment of an installation of the hand dryer 200 in an aircraft lavatory 100. In this embodiment, the hand dryer 200 is configured as illustrated in FIG. 2A or 2B and is installed in a vertical surface of the lavatory 100, for example, within the counter 105 as illustrated, with the ducting 205 routed as necessary. The hand dryer 200 may be installed in any other wall in the lavatory 100 as well, again with ducting 205 routing as needed.

FIGS. 6A and 6B are diagrams illustrating another embodiment of the installation of the hand dryer 200 in the aircraft lavatory 100. In this embodiment, the hand dryer 200 is configured as illustrated in FIGS. 4A and 4B and is installed in a horizontal surface of the lavatory 100, for example, on the upper surface of the counter 105 as illustrated, with the ducting 205 routed as necessary. The hand dryer 200 may also be mounted to alternative horizontal surfaces of the lavatory 100.

Figure 7:
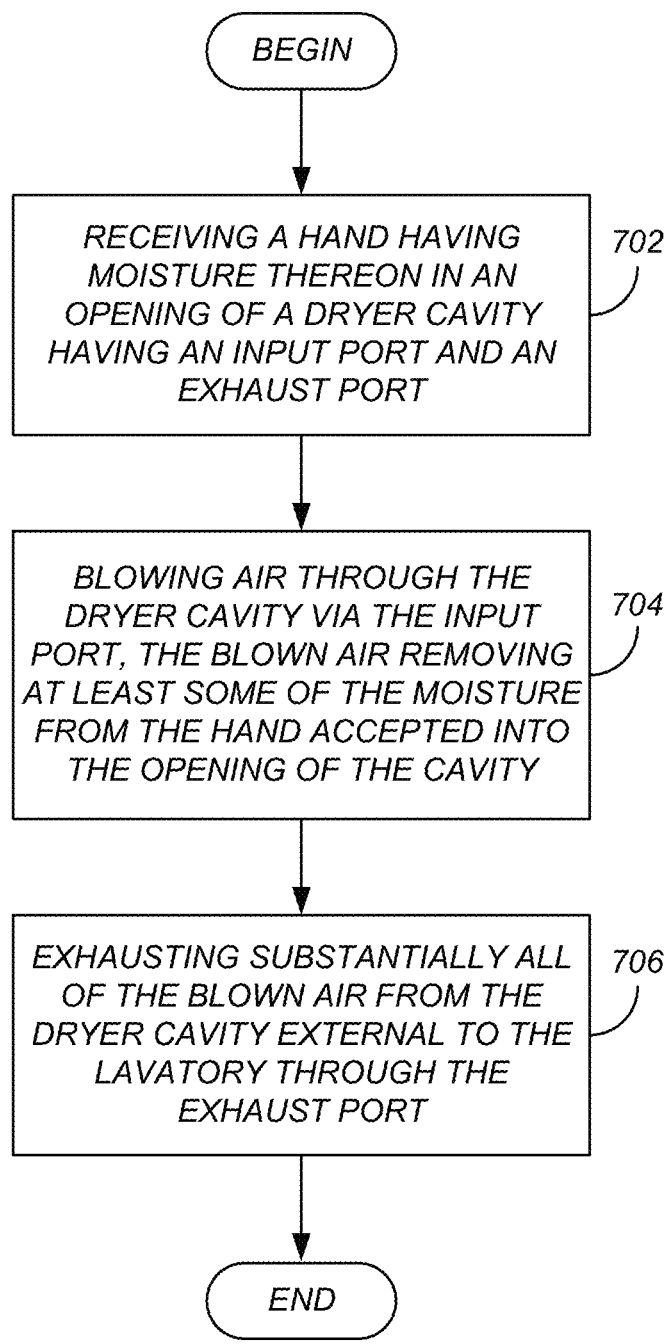
FIG. 7 is a diagram illustrating exemplary operations that can be performed to drying one or more of a user's hands in a lavatory of the aircraft.

FIG. 7 is a diagram illustrating exemplary operations that can be performed to drying one or more of a user's hands in a lavatory 100 of an aircraft. In block 702, at least one of the user's hands is received or accommodated into an opening 230 of a dryer cavity 228 having an input port 204 and an exhaust port 206. In block 704, air is blown through the dryer cavity 238 via the input port 204, and the blown air removes at least some of the moisture from the hand accepted into the opening 230 of the cavity 228. In block 706, substantially all of the air blown into the dryer cavity 228 via the input port 204 is exhausted external to the lavatory 100 through the exhaust port 206.

The foregoing operations may be practiced in a number of embodiments, the features of which may be used in different combinations as desired.

In one such exemplary embodiment, the air is blown through the dryer cavity using a blower 214 which may comprise an electric motor and fan assembly. In a further related embodiment, air exhausted from the dryer cavity 228 is air that is drawn from the dryer cavity 228 by a second blower 220 disposed proximate the exhaust port 206.

The blown air that is removed from the dryer cavity 228 may be provided to the input port in a number of different ways. In an exemplary embodiment, the blown air exhausted from the dryer cavity 228 through the exhaust port 206 is provided or recirculated back to the input port 204 via a closed circuit air path 212. In another related embodiment, the air blown through the dryer cavity 228 via the input port 204 is air that has been accepted from an ECS 250 of the aircraft, and the air exhausted from the dryer cavity 228 via the exhaust port 206 is exhausted to the ECS 250.

In still other embodiments, an antimicrobial is directed substantially into the drying cavity 228 to assist in sanitizing the user's hands during the hand drying process. This antimicrobial may comprise UV light or a chemical antimicrobial. Further, a moisture containment device 222 proximate the exhaust port may be used to remove moisture from the exhausted blown air.

Those skilled in the art will recognize many modifications may be made to this configuration without departing from the scope of the present disclosure. For example, those skilled in the art will recognize that any combination of the above components, or any number of different components, peripherals, and other devices, may be used. For example, although the foregoing embodiments depict a dryer cavity having an input port pneumatically coupled to either closed circuit air channel, air that is provided to the blower 214 and blown into the cavity 228 may be obtained from the ambient air in the interior volume 102 of the lavatory 100. The air passing through the exhaust port 206 may be provided to the ECS 250 for conditioning, and simply provided to the aircraft cabin or to a vent in the lavatory 100 itself. Further, although described as being used to dry hands in an aircraft lavatory, the foregoing principles are also applicable for other applications, for example, in the drying of other objects, and in different locations where reducing the effect of the drying process on small enclosed volumes is desired.

CONCLUSION

This concludes the description of a number of embodiments of the present disclosure. The foregoing description of the embodiments has been presented for the purposes of illustration and description. It is not intended to be exhaustive or to limit the disclosure to the precise form disclosed. Many modifications and variations are possible in light of the above teaching, including modifications for other confined-space or low-volume lavatories such as on trains, ships, buses, and so on. It is intended that the scope of rights be limited not by this detailed description, but rather by the claims appended hereto.

What is claimed is:

1. A hand dryer for use in a lavatory of an enclosed vehicle, comprising:
   a dryer cavity including an input port, an exhaust port, and an opening for insertion of a hand having moisture thereon;
   an air channel, pneumatically coupling the exhaust port of the dryer cavity to the input port of the dryer cavity, the air channel isolated from an interior volume of the lavatory; and
   a blower, communicatively coupled to the air channel, for moving air through the air channel and the dryer cavity.

2. The hand dryer of claim 1, wherein:
   the air channel comprises a closed-circuit air path, pneumatically sealingly coupling the exhaust port of the dryer cavity to the input port of the dryer cavity.

3. The hand dryer of claim 1, wherein:
   the enclosed vehicle comprises an environmental control system (ECS); and
   the air channel pneumatically couples the exhaust port of the dryer cavity to the input port of the dryer cavity via the ECS.

4. The hand dryer of claim 3, wherein:
   the ECS includes an ECS air source port and an ECS air exhaust port; and
   the input port of the dryer cavity is pneumatically coupled to the ECS air source port and the exhaust port of the dryer cavity pneumatically coupled to the ECS air exhaust port.

5. The hand dryer of claim 1, wherein the dryer cavity is substantially enclosed around the opening such that the air moved by the blower through the dryer cavity is substantially exhausted from the dryer cavity via the exhaust port.

6. The hand dryer of claim 1, further comprising:
   a hand sanitizer, for directing an antimicrobial substantially into the drying cavity.

7. The hand dryer of claim 6, wherein:
   the hand sanitizer comprises a source of ultraviolet light, directing the ultraviolet light substantially only within the drying cavity; and
   the drying cavity comprises at least one surface configured to substantially confine the ultraviolet light to within the drying cavity.

8. The hand dryer of claim 1, wherein the input port and exhaust port are disposed on opposing sides of the dryer cavity.

9. The hand dryer of claim 1, wherein the input port and exhaust port are disposed on horizontally opposing sides of the dryer cavity.

10. The hand dryer of claim 1, wherein:
    the blower is disposed proximate the input port of the dryer cavity; and
    the hand dryer further comprises a second blower disposed proximate the exhaust port of the dryer cavity, for drawing the air from the dryer cavity and away from the lavatory.

11. The hand dryer of claim 1, further comprising a moisture containment device disposed proximate the exhaust port.

12. The hand dryer of claim 1, further comprising:
    a moisture containment device comprising a pneumatically transparent screen, for removing moisture from the air drawn from the dryer cavity;
    a second blower, disposed downstream from the pneumatically transparent screen, for drawing the air from the dryer cavity and through the pneumatically transparent screen.

13. A lavatory of an aircraft, comprising the hand dryer of claim 1.

14. An aircraft, comprising the lavatory of claim 13.

15. A method of drying a hand in a lavatory, comprising:
    receiving the hand having moisture thereon in an opening of a dryer cavity having an input port and an exhaust port;
    blowing air through the dryer cavity via the input port, the blown air removing at least some of the moisture from the hand accepted into the opening of the cavity;
    exhausting the blown air from the dryer cavity external to the lavatory through the exhaust port; and
    providing the blown air from the exhaust port to the input port of the dryer cavity via an air channel isolated from an interior volume of the lavatory.

16. The method of claim 15, wherein providing the blown air from the exhaust port to the input port of the dryer cavity via the air channel isolated from the interior volume of the lavatory comprises providing the blown air from the exhaust port to the input port of the dryer cavity via a closed-circuit air path.

17. The method of claim 16, wherein:
blowing air through the dryer cavity via the input port comprises:
   accepting air from an environmental control system (ECS) of an aircraft; and
   blowing the accepted air through the dryer cavity via the input port;
exhausting substantially all of the blown air from the dryer cavity external to the lavatory through the exhaust port comprises:
   exhausting substantially air blown through the exhaust port from the dryer cavity to the ECS.

18. The method of claim 15, wherein:
blowing air through the dryer cavity via the input port comprises:
   blowing air through the dryer cavity using a first blower;
exhausting substantially all of the blown air from the dryer cavity external to the lavatory through the exhaust port comprises:
   drawing substantially all of the blown air from the dryer cavity external to the lavatory via a second blower.

19. The method of claim 15, further comprising:
directing an antimicrobial substantially into the drying cavity.

20. An apparatus for drying a hand in a lavatory, comprising:
   means for accepting the hand having moisture thereon in an opening of a dryer cavity having an input port and an exhaust port;
   means for blowing air through the dryer cavity via the input port, the blown air removing moisture from the hand accepted into the opening of the cavity;
   means for exhausting the blown air from the dryer cavity external to the lavatory through the exhaust port; and
   means for providing the blown air from the exhaust port to the input port of the dryer cavity via an air channel isolated from an interior volume of the lavatory.

* * * * *